US012781887B2

(12) United States Patent
Clauss et al.

(10) Patent No.: US 12,781,887 B2
(45) Date of Patent: Nov. 3, 2026

(54) CLAMPING PIPE RESTRAINT

(71) Applicant: The Metraflex Company, Chicago, IL (US)

(72) Inventors: James D. Clauss, Frankfort, IL (US); Daniel T. Holbach, Kildeer, IL (US); Jackson Kamedulski, Chicago, IL (US); James Reynold Richter, Chicago, IL (US); Daniel R. Kish, Chicago, IL (US); Elizabeth Ann Monk, Chicago, IL (US); Jay R. Johnson, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

(21) Appl. No.: 18/913,436

(22) Filed: Oct. 11, 2024

(65) Prior Publication Data

US 2026/0104116 A1 Apr. 16, 2026

(51) Int. Cl.
*F16L 23/02* (2006.01)
*F16L 21/08* (2006.01)

(52) U.S. Cl.
CPC .................................... *F16L 21/08* (2013.01)

(58) Field of Classification Search
CPC . F16L 21/08; F16L 21/04; F16L 23/02; F16L 23/024; F16L 23/032; F16L 25/12
See application file for complete search history.

(56) References Cited

U.S. PATENT DOCUMENTS 1,735,029 A 11/1929 Zifferer
1,789,379 A * 1/1931 Dillon ..................... F16L 21/06 285/104
2,514,059 A 7/1950 Hicks et al.
3,252,192 A 5/1966 Smith
4,192,143 A 3/1980 Häegele
4,488,388 A 12/1984 Schmidt
5,190,324 A * 3/1993 Bird ..................... F16L 23/032 285/368
5,209,524 A 5/1993 Corwon et al.
5,779,285 A 7/1998 Robison
7,661,731 B2 2/2010 Bradley
8,070,190 B2 12/2011 Pires Cabado et al.
8,096,591 B2 1/2012 Gentile, Jr. et al.
9,163,760 B2 10/2015 Lundstrom et al.
9,285,060 B2 3/2016 Griggs, III et al.
9,982,803 B2 5/2018 Kipp
2012/0025524 A1 2/2012 Krausz et al.
2012/0318371 A1 12/2012 Rynders, Jr. et al.
2013/0213546 A1 8/2013 Cichon, Jr.

FOREIGN PATENT DOCUMENTS

GB 1591743 6/1981
JP 3948818 B2 * 7/2007 .............. F16L 41/12

OTHER PUBLICATIONS

Translation JP 3948818 (Year: 2007).*

* cited by examiner

*Primary Examiner* — Aaron M Dunwoody
(74) *Attorney, Agent, or Firm* — Greer, Burns & Crain, Ltd.

(57) ABSTRACT

A clamping pipe restraint for a conduit. The pipe restraint has an end clamp with a body having an inner surface surrounding an outer surface of a pipe. A plurality of teeth are formed on the inner surface and engage with the outer surface of the pipe. The plurality of teeth include teeth oriented in opposite directions about a centerline of the end clamp.

15 Claims, 5 Drawing Sheets

CLAMPING PIPE RESTRAINT

FIELD OF THE DISCLOSURE

This disclosure relates generally to pipe couplings and, more particularly, to a clamping pipe restraint.

BACKGROUND

Pipe coupling assemblies couple two or more pipes together and prevent the pipes from separating under load (e.g., while fluid is passing from one pipe to another pipe). In general, pipe coupling assemblies prevent axial movement of the joined pipes to prevent unwanted disconnection.

In some instances, pipe coupling assemblies include flexible couplings. Flexible couplings eliminate the need to weld pipes together or use securing flanges, which require a fastening means such as nuts and bolts and increase assembly and disassembly time. These flexible couplings can be made of a plastic or rubber material to allow flexibility in joining the pipes together. Flexible couplings are thus subject to movement under load since there is no permanent connection of the pipes and the material used is generally ductile.

In some examples, the pipes, when under load (e.g., when fluid is moving through the pipes), can experience axial and rotational/torque forces. Both forces can result in failure of the flexible coupling and thus result in failure of the piping system if not properly maintained and regularly checked. Some existing flexible couplings are unable to prevent rotational movement that may occur during load events.

Therefore, there is a need for a clamping pipe restraint that can be used with flexible couplings to prevent both axial and rotational movement under load and thus reduce the need for constant maintenance and regular checks while also reducing failures of the pipe coupling assembly.

BRIEF DESCRIPTION OF THE DRAWINGS

A new clamping pipe restraint has been invented which addresses one or more of the foregoing.

Accordingly, in an aspect of the present invention, the present invention may be generally characterized as providing an end clamp for a clamping pipe restraint comprising a body with an inner surface surrounding an outer surface of a pipe and a plurality of teeth disposed on the inner surface configured to engage with the outer surface of the pipe, the plurality of teeth comprising teeth oriented in opposite directions about a centerline of the end clamp.

In another aspect, the present invention may be characterized, broadly, as providing a clamping pipe restraint comprising a first end clamp, a second end clamp, a first aperture at a first body extension on the first end clamp, the first aperture comprising a first notch, a second aperture at a second body extension on the second end clamp, the second aperture comprising a second notch, and a tie rod, wherein the tie rod is threaded and comprises a recess compatible with the first notch in the first aperture and the second notch in the second aperture.

In further another aspect, the present invention may be characterized, generally, as providing an apparatus comprising a coupling configured to join a first pipe and a second pipe, and a clamping pipe restraint securing the first pipe and the second pipe, the clamping pipe restraint comprising a first end clamp and a second end clamp, the first end clamp configured to surround the first pipe and the second end clamp configured to surround the second pipe and a tie rod extending through the first end clamp and the second end clamp, wherein each of the first end clamp and the second end clamp each comprise a plurality of teeth arranged on an inner surface of the respective end clamp to engage with an outer surface of the first pipe and the second pipe, respectively, each plurality of teeth comprising teeth oriented in opposite directions about a centerline of the first end clamp and the second end clamp.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached drawings will make it possible to understand how the invention can be produced and practiced.

Figure 1:
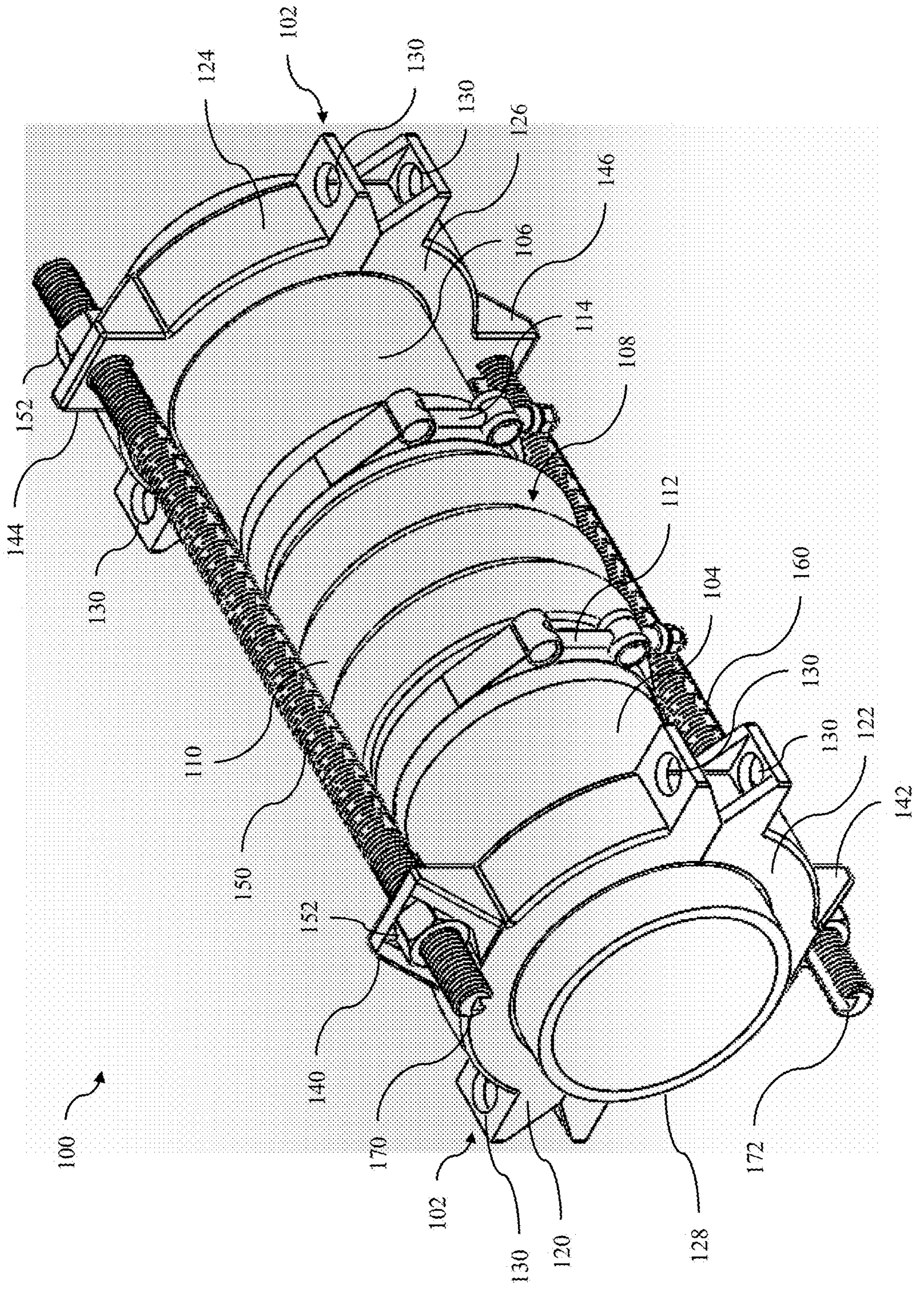

FIG. 1 depicts an example pipe coupling assembly including a clamping pipe restraint according to the examples disclosed herein.

Figure 2:
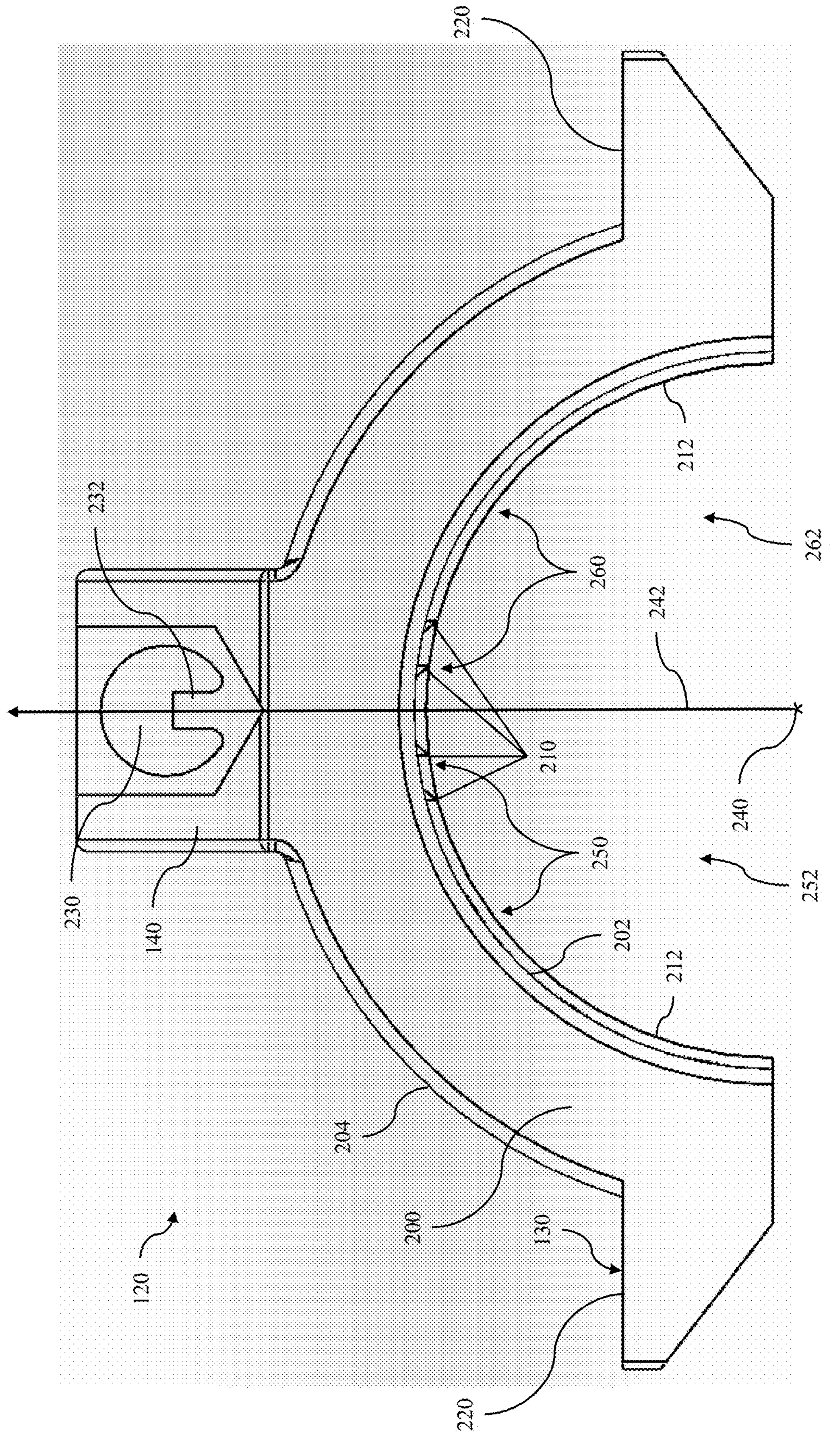

FIG. 2 depicts an example of one half clamp of the clamping pipe restraint of FIG. 1.

Figure 3:
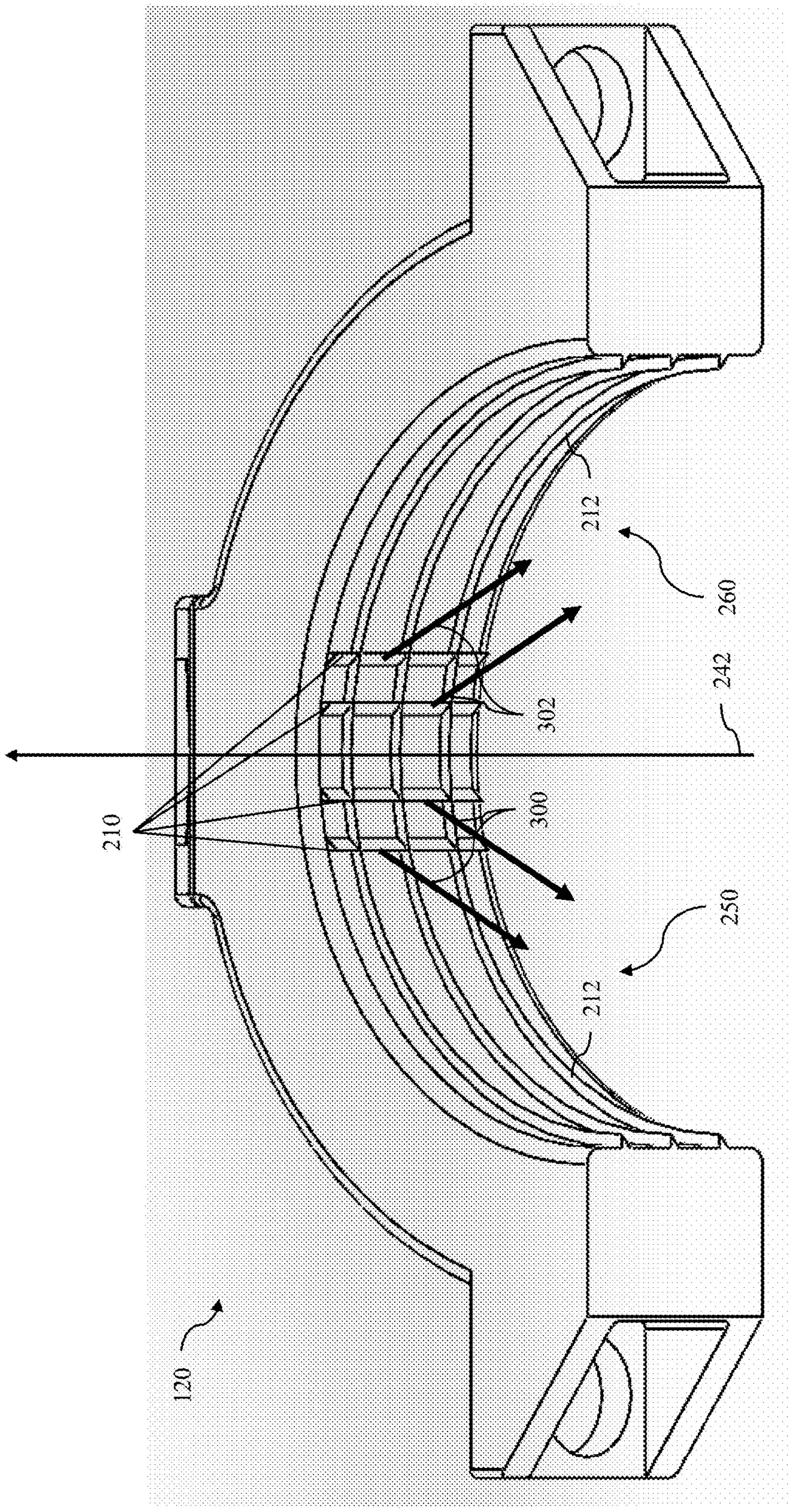

FIG. 3 illustrates the plurality of teeth of the half clamp of FIG. 2.

Figure 4:
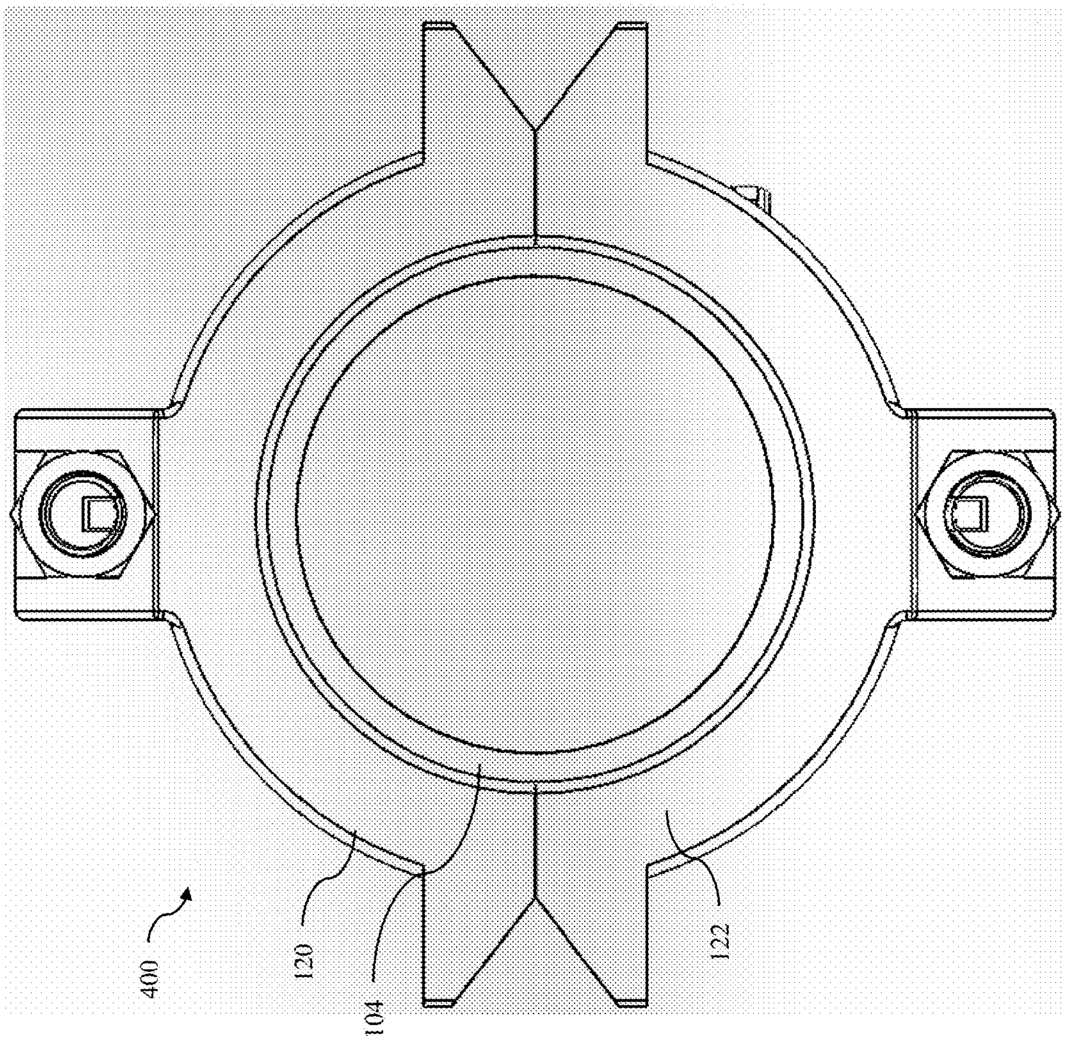

FIG. 4 depicts an end clamp comprising two of the half clamps of FIG. 2.

Figure 5:
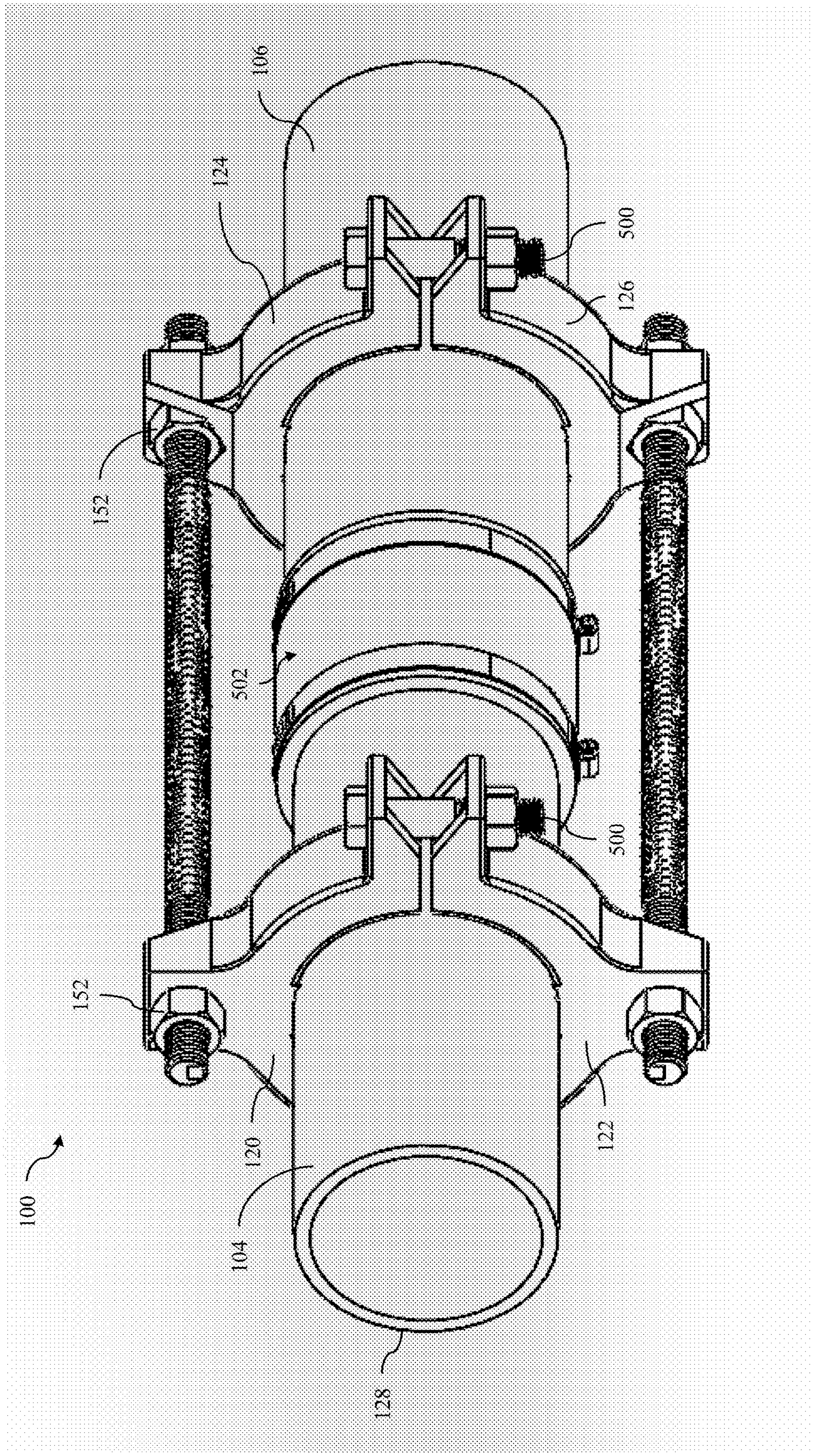

FIG. 5 is an alternate view of the example pipe coupling assembly of FIG. 1.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in “contact” with another part is defined to mean that there is no intermediate part between the two parts.

Unless specifically stated otherwise, descriptors such as “first,” “second,” “third,” etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly that might, for example, otherwise share a same name.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As mentioned above, a new pipe restraint has been invented which includes a flexible coupling to join a first pipe and a second pipe and a clamping pipe restraint to secure the first pipe to the second pipe, wherein the clamping pipe restraint includes a series of end clamps with teeth arranged in a non-tangential orientation to reduce axial and rotational movement while the first pipe and the second pipe are under load.

Accordingly, with reference the attached drawings, one or more embodiments of the present invention will now be described with the understanding that the described embodiments are merely preferred and are not intended to be limiting.

With reference to FIG. 1, a pipe coupling assembly 100 including a clamping pipe restraint 102 according to the examples disclosed herein is shown. The pipe coupling assembly 100 is configured to couple a first pipe 104 to a second pipe 106. The first pipe 104 and the second pipe 106 can be made of any one or more of a ductile iron, steel, copper, acrylonitrile butadiene styrene (ABS), polyvinyl chloride (PVC), etc.

In the example of FIG. 1, the first pipe 104 is coupled to the second pipe 106 via, for example, a flexible coupling 108. In the examples disclosed herein, the flexible coupling 108 includes flex connector 110, a first flex connector clamp 112, and a second flex connector clamp 114. The flex connector 110 is made of a ductile material such as rubber or neoprene and surrounds the first pipe 104 and the second pipe 106. The first flex connector clamp 112 secures the flex connector 110 to the first pipe 104 and the second flex connector clamp 114 secures the flex connector 110 to the second pipe 106. In some examples, the first flex connector clamp 112 and the second flex connector clamp 114 include stainless steel bands with T-bolt clamps for securing to the first pipe 104 and the second pipe 106. The flexible coupling 108 thus couples to the first pipe 104 and the second pipe 106 to allow fluid to pass from the first pipe 104 to the second pipe 106 (or vice versa) without the need for welding or securing flanges.

The clamping pipe restraint 102 of FIG. 1 includes a first half clamp 120, a second half clamp 122, a third half clamp 124, and a fourth half clamp 126. In the examples disclosed herein, the half clamps 120, 122, 124, 126 are identical and thus only one will be described in further detail herein. It should be noted than more or less than four total half clamps may be used herein.

The first half clamp 120 surrounds half of an outer surface 128 of the first pipe 104. In the configuration depicted in the example of FIG. 1, the first half clamp 120 and the second half clamp 122 surround the first pipe 104 and the third half clamp 124 and the fourth half clamp 126 surround the second pipe 106.

The first half clamp 120 includes a connector hole 130 on opposite sides of the first pipe 104 (e.g., two total connector holes 130). The connector hole 130 interfaces with a corresponding connector hole 130 on the second half clamp 122. In the examples disclosed herein, the first half clamp 120 and the second half clamp 122 are coupled using a coupling means through the connector hole 130 (not shown). Likewise, the third half clamp 124 and the fourth half clamp 126 are coupled using the coupling means through the connector hole 130. The coupling means can include a locking pin, a nut and bolt system, rivets, or any other coupling means.

The first half clamp 120 includes a first body extension 140. Likewise, the second half clamp 122 includes a second body extension 142, the third half clamp 124 includes a third body extension 144, and the fourth half clamp 126 includes a fourth body extension 146.

In order to reduce rotational movement due to torque forces, the clamping pipe restraint 102 includes a first tie rod 150. The first body extension 140 and the third body extension 144 are configured to receive the first tie rod 150. Therefore, in the example of FIG. 1, the first half clamp 120 is secured to the third half clamp 124 via the first tie rod 150.

In the examples disclosed herein, the first tie rod 150 is threaded. The threads of the first tie rod 150 correspond to threads on a nut 152 to allow the nut 152 to secure the first tie rod 150 to the first half clamp 120. Likewise, the nut 152 can be used on the corresponding third half clamp 124 to allow the nut 152 to secure the first tie rod 150 to the third half clamp 124, and therefore the first half clamp 120 to the third half clamp 124. Although the nut 152 is used herein to describe the securing of the first tie rod 150 to the first half clamp 120 and the third half clamp 124, it should be understood that any other compatible securing device can be used herein such as a pin, rivet, dowels, etc. Additionally, according to the examples disclosed herein, the nut 152 is configured to secure the first tie rod 150 to the first half clamp 120 on either side or both sides of the first half clamp 120 (see FIG. 5). Including the nut 152 on either side further reduces axial and rotational movement when the pipe 104, 106 is under load.

In some examples, the clamping pipe restraint 100 includes a second tie rod 160. The second body extension 142 of the second half clamp 122 and the fourth body extension 146 of the fourth half clamp 126 are configured to receive the second tie rod 106. Therefore, in the example of FIG. 1, the second half clamp 122 is secured to the fourth half clamp 126 via the second tie rod 160.

Similar to that of the first tie rod 150, the second tie rod 160 is threaded. The threads of the second tie rod 160 correspond to threads on the nut 152 to allow the nut 152 to secure the second tie rod 160 to the second half clamp 122, and therefore the second half clamp 122 to the fourth half clamp 126. Likewise, the nut 152 can be used on the corresponding fourth half clamp 126 to allow the nut 152 to secure the second tie rod 160 to the fourth half clamp 126.

In some examples, the first tie rod 150 and the second tie rod 160 are made of a metallic material such as iron, steel, titanium, etc.

In some examples, the first tie rod 150 includes a first recess 170. The first recess 170 interfaces with a corresponding notch (FIG. 2) on the first body extension 140 of the first half clamp 120 and the third body extension 144 of the third half clamp 124. Likewise, in some examples, the second tie rod 160 includes a second recess 172. The second recess 172 interfaces with a corresponding notch on the second body extension 142 of the second half clamp 122 and the fourth body extension 146 of the fourth half clamp 126. In examples disclosed herein, the first recess 170 and the second recess 172 extend a length of the first tie rod 150 and the second tie rod 160 respectively. The first recess 170 and the second recess 172 further reduce rotational movement due to torque forces by providing an additional securing mechanism for coupling the first half clamp 120 to the third half clamp 124 and the second half clamp 122 to the fourth half clamp 126 respectively.

Inclusion of the first tie rod 150 and the second tie rod 160, including the corresponding first recess 170 and the second recess 172, provide a stiffening force that counteracts rotational movement caused by torque forces while the first pipe 104 and the second pipe 106 are under load (e.g., fluid is flowing between the pipes 104, 106). Additionally, the securing device (e.g., the nut 152) provides an additional axial stiffening in addition to that already provided by the flexible coupling 108. Therefore, the clamping pipe restraint 102 provides improved axial stiffening in addition to reducing rotational movement of the pipes 104, 106 as a result of the axial and torque forces generated while the pipe coupling assembly 100 is under load.

FIG. 2 depicts an example of one half clamp (e.g., the first half clamp 120) of the clamping pipe restraint 102 of FIG. 1. The half clamp 120 of FIG. 2 includes a body 200. The body 200 includes an inner surface 202 and an outer surface 204.

The inner surface 202 surrounds the first pipe 104. In the examples disclosed herein, the inner surface 202 includes a plurality of teeth 210 and anchor teeth 212 configured to engage with the outer surface 128 of the first pipe 104 (FIG. 1). Notably, the plurality of teeth 210 do not perpendicularly engage with the outer surface 128 of the first pipe 104. The plurality of teeth 210 are configured to engage with the first pipe 104 in a non-perpendicular orientation. The plurality of teeth 210 and the anchor teeth 212 are described in further detail herein with reference to FIG. 3.

In the example of FIG. 2, the first half clamp 120 further includes a flange 220. The flange 220 is configured to be a surface for which the connector hole 130 is disposed on. According to the example of FIG. 2, the flange 220 is also disposed on the opposite side of the first half clamp 120. Similarly, the second half clamp 122, the third half clamp 124, and the fourth half clamp 126 also include the flange 220 for the connector hole 130.

Further, in the example of FIG. 2, the body extension 140 includes an aperture 230 and a notch 232. The aperture 230 is configured to receive the first tie rod 150. The notch 232 corresponds to the recess 170 of the first tie rod 150.

In examples disclosed herein, the first half clamp 120 includes a center point 240 oriented at a center of the first pipe 104. A centerline 242 extends outwards from the center point 240 towards the first body extension 140. In the examples discloses herein, the plurality of teeth 210 and the anchor teeth 212 can be represented as a first plurality of teeth 250 on a first side 252 of the centerline 242 and a second plurality of teeth 260 on a second side 262 of the centerline 242. As disclosed in further detail herein, the first plurality of teeth 250 are oriented in a opposite direction than the second plurality of teeth 260 to engage with the first pipe 104. In the examples disclosed herein, the anchor teeth 212 extend circumferentially from the centerline 242 along the inner surface 202, intersecting the plurality of teeth 210 (see FIG. 3).

FIG. 3 illustrates the plurality of teeth 210 and the anchor teeth 212 of the half clamp (e.g., the first half clamp 120) of FIG. 2. As illustrated in FIG. 3, the plurality of teeth 210 of the first plurality of teeth 250 are oriented in a first direction 300, and the plurality of teeth 210 of the second plurality of teeth 260 are oriented in a second direction 302. As such, the plurality of teeth 210 do not engage the first pipe 104 in a perpendicular orientation. In contrast, the anchor teeth 212 do engage the first pipe 104 in a perpendicular direction.

Orienting the plurality of teeth 210 to engage with the first pipe 104 in a non-perpendicular orientation increases the torque force resistance of the clamping pipe restraint 102. In particular, the plurality of teeth 210 are less likely to slip (e.g., disengage with the first pipe 104) when the plurality of teeth 210 are oriented according to the example of FIG. 3 since a clamping force applied by the clamping pipe restraint 104 on the first pipe 104 is acting in more than one axis (e.g., a first axis perpendicular to the outer surface 128 of the first pipe 104 and a second axis tangential to the outer surface 128 of the first pipe 104). Reducing slippage of the plurality of teeth 210 therefore increases the ability of the clamping pipe restraint 102 to withstand torque forces under load.

In the examples disclosed herein, the plurality of teeth 210 reduce rotational movement and axial movement due to the non-perpendicular orientation of the plurality of teeth 210 (e.g., the plurality of teeth 210 provide a resistive force in more than one axis). The anchor teeth 212 reduce axial movement only since the anchor teeth 212 engage with the first pipe 104 in a perpendicular orientation.

FIG. 4 depicts an end clamp 400 consisting of two of the half clamps (e.g., the first half clamp 120 and the second half clamp 122) of FIG. 2. As shown in FIG. 4, the first half clamp 120 and the second half clamp 122 surround the first pipe 104. Alternatively, and as described herein, the third half clamp 124 and the fourth half clamp 126 surround the second pipe 106.

The first half clamp 120 and the second half clamp 122 are coupled via a coupling means (FIG. 5). As disclosed herein, the coupling means can include a locking pin, a nut and bolt system, rivets, etc. In the examples disclosed herein, the coupling means includes a nut and bolt system.

FIG. 5 is an alternate view of the example pipe coupling assembly 100 of FIG. 1. The example of FIG. 5 shows the coupling means 500 as described in FIG. 4 securing the first half clamp 120 and the second half clamp 122 as well as the third half clamp 124 and the fourth half clamp 126.

In FIG. 5, a no-hub coupling 502 is provided instead of the flexible coupling 108. In such examples, the no-hub coupling 502 is a shielded flexible coupling that couples the first pipe 104 and the second pipe 106. Usage of the no-hub coupling 502 reduces the axial and rotational movement, especially during seismic activity.

Also as shown in FIG. 5, the first pipe 104 and the second pipe 106 are different sizes. In this specific example, the second pipe 106 has a larger diameter than that of the first pipe 104. The no-hub coupling 502 or the flexible coupling 108 is configured to receive pipes of the same or different sizes to couple the first pipe 104 to the second pipe 106. In such an example, the half clamps 120, 122, 124, 126 are configured to surround the outer surface (e.g., the outer surface 128) of the pipe 104, 106 regardless of the size of the pipe 104, 106.

From the foregoing, it will be appreciated that example systems, apparatus, and articles of manufacture have been disclosed that provide a clamping pipe restraint to reduce axial and rotational movement caused by axial and torque forces respectively.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A clamping pipe restraint comprising:
- a first end clamp;
- a second end clamp;
- a first aperture at a first body extension on the first end clamp, the first aperture comprising a first notch;
- a second aperture at a second body extension on the second end clamp, the second aperture comprising a second notch; and
- a tie rod, wherein the tie rod is threaded and comprises a recess compatible with the first notch in the first aperture and the second notch in the second aperture.

2. The clamping pipe restraint of claim 1, wherein the recess in the tie rod extends a length of the tie rod.

3. The clamping pipe restraint of claim 1, wherein the tie rod is secured to the end clamp via a securing device, the securing device comprising a nut compatible with the threads in the tie rod.

4. The clamping pipe restraint of claim 1, further comprising:
- a third aperture at a third body extension on the first end clamp, the third body extension opposite the first body extension, the third aperture comprising a third notch; and
- a fourth aperture at a fourth body extension on the second end clamp, the fourth body extension opposite the second body extension, the fourth aperture comprising a fourth notch.

5. The clamping pipe restraint of claim 4, wherein the tie rod is a first tie rod and the recess is a first recess, further including a second tie rod, wherein the second tie rod is threaded and comprises a second recess compatible with the third notch in the third aperture and the fourth notch in the fourth aperture.

6. The clamping pipe restraint of claim 5, wherein the second recess extends a length of the second tie rod.

7. An apparatus comprising:
- a coupling configured to join a first pipe and a second pipe; and
- a clamping pipe restraint securing the first pipe and the second pipe, the clamping pipe restraint comprising:
  - a first end clamp and a second end clamp, the first end clamp configured to surround the first pipe and the second end clamp configured to surround the second pipe; and
  - a tie rod extending through the first end clamp and the second end clamp;
  - wherein each of the first end clamp and the second end clamp each comprise a plurality of teeth arranged on an inner surface of the respective end clamp to engage with an outer surface of the first pipe and the second pipe, respectively, each plurality of teeth comprising teeth oriented in different directions away from a center point of the first end clamp and a center point of the second end clamp, respectively.

8. The apparatus of claim 7, wherein the first end clamp comprises a first half clamp and a second half clamp and the second end clamp comprises a third half clamp and a fourth half clamp.

9. The apparatus of claim 8, wherein the first half clamp is coupled to the second half clamp around the first pipe and the third half clamp is coupled to the fourth half clamp around the second pipe.

10. The apparatus of claim 9, wherein the first half clamp is coupled to the second half clamp via a first securing device and the third half clamp is coupled to the fourth half clamp via a second securing device, the first securing device and the second securing device comprising a nut.

11. The apparatus of claim 9, wherein the tie rod is a first tie rod arranged at a first location relative to the first pipe and the second pipe, the apparatus further comprising a second tie rod arranged at a second location relative to the first pipe and the second pipe opposite the first location.

12. The apparatus of claim 11, wherein the first tie rod secures the first half clamp to the third half clamp and the second tie rod secures the second half clamp to the fourth half clamp.

13. The apparatus of claim 12, wherein the first half clamp comprises a first aperture, the second half clamp comprises a second aperture, the third half clamp comprises a third aperture, and the fourth half clamp comprises a fourth aperture, wherein the first tie rod extends through the first aperture and the third aperture and the second tie rod extends through the second aperture and the fourth aperture.

14. The apparatus of claim 13, wherein first aperture includes a first notch, the second aperture includes a second notch, the third aperture includes a third notch, and the fourth aperture includes a fourth notch, wherein the first tie rod comprises a first recess compatible with the first notch and the third notch, and the second tie rod comprises a second recess compatible with the second notch and the fourth notch.

15. The apparatus of claim 7, wherein the tie rod secures the first end clamp to the second end clamp via a securing device, the tie rod comprising a threaded outer surface, the securing device comprising a nut compatible with the threaded outer surface of the tie rod.

* * * * *